Sept. 20, 1966   HACHIRO IKEDA ETAL   3,273,996
METHOD FOR MANUFACTURING ALUMINUM
Filed Sept. 2, 1964
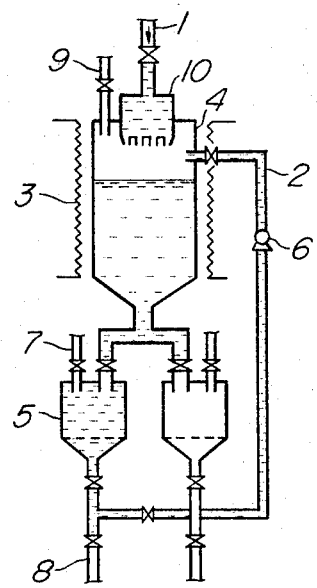
INVENTORS
Hachiro Ikeda
Juntaro Yurimoto
Hirosuke Ryu
By Stevens, Davis, Miller & Mosher
ATTORNEYS United States Patent Office 3,273,996
Patented Sept. 20, 1966

3,273,996
METHOD FOR MANUFACTURING ALUMINUM
Hachiro Ikeda, Nagoya, and Juntaro Yurimoto and Hirosuke Ryu, Niihama-shi, Japan, assignors to Sumitomo Chemical Company, Ltd., Osaka, Japan, a corporation of Japan
Filed Sept. 2, 1964, Ser. No. 393,933
Claims priority, application Japan, Oct. 29, 1960, 35/43,546
17 Claims. (Cl. 75—68)

This is a continuation-in-part of co-pending application, Serial No. 147,786, filed Oct. 26, 1961, and now U.S. Patent No. 3,154,407.

This invention relates to a method for manufacturing aluminum. More particularly, it relates to a method for manufacturing aluminum, together with olefins and hydrogen, by thermal decomposition or pyrolysis of a complex compound of an alkylaluminum compound and an alkali metal compound.

K. Ziegler et al. has suggested a method for manufacturing high purity aluminum by thermal decomposition or pyrolysis of alkylaluminum compound (see, for example, Angew, Chem. vol. 67, No. 16, pages 424–425 (1955); British Patent No. 788,619; Japanese Patent Publication No. SHO 32–2454). According to their method, the single alkylaluminum compound is merely decomposed by heating in the liquid state. In such a method, however, it is extremely difficult to recover, wash and dry the aluminum produced in the complete absence of air to obtain the final product. This is true especially when a continuous process is contemplated.

When the decomposition is effected in vacuo in the gaseous state according to the method of Ziegler et al., there are also some difficulties from technical and economic points of view, in maintaining the apparatus of commercial scale in an evacuated state. Thus, leakage of a large amount of air tends to cause danger of inflammation of the alkylaluminum compound, and leakage of even a small amount of air tends to lower the purity of aluminum due to the formation of byproducts, such as aluminum carbide, as set forth in the following Table 1.

TABLE 1

| | | | | |
|---|---|---|---|---|
| Air content in the gaseous atmosphere (percent) | 0.0 | 5.0 | 10.0 | 25.0 |
| Aluminum carbide content in the metal produced (percent) | 0.0 | 1.2 | 2.0 | 8.9 |

K. Ziegler et al. have also suggested a way to accomplish the same effects as gaseous state decomposition by blowing a large amount of hydrogen into an alkylaluminum compound and directing the vapor of said compound plus hydrogen onto a heated surface to cause decomposition. According to this method, however, a part of the alkylaluminum compound cannot avoid denaturization, which seems to be caused by the oxygen or moisture present in the hydrogen in unavoidably minute amounts. From these alkylaluminum compounds pure aluminum cannot be isolated.

In this gaseous state decomposition methods, also, continuous separation of the resultant aluminum is difficult because the aluminum is deposited on a heated surface and forms a film or a mirror which is quite difficult to remove. Besides, the heat conductivity is adversely affected by such film or mirror as time elapses, whereby heat control becomes difficult.

Furthermore, K. Ziegler et al. have suggested the possibility of a continuous operation by blowing the vapor of an alkylaluminum compound onto the surface of molten aluminum, thereby permitting the decomposition of the compound on the liquid aluminum, and taking out the increment directly from the molten aluminum. It is, however, apparent from the prior art publications that a thermal cracking reaction of the olefin produced might occur, which would cause contamination of the aluminum by carbon, or other unfavorable side reactions, at temperatures at which aluminum is molten, i.e. at about 700° C. or higher (see, for example, G. Egloff; "The Reactions of Pure Hydrocarbons," pages 336–340 (1937)). Thus, this method could not give sufficiently pure aluminum with a favorable yield.

As mentioned above, the conventional methods of thermal decomposition of alkylaluminum compounds have not succeeded in continuous production of high purity aluminum on a commercial-scale by an easy and economical procedure. A method comprising dissolving or dispersing an alkylaluminum compound in a thermally stable inert organic solvent, and heating the solution, or adding the compound to a heated solvent to carry out the decomposition of the said compound, appears to almost completely solve the aforementioned problems. In this method, however, a large amount of the solvent is required to make it effective as a medium, and this fact results in problems of providing a large volume of each part of the apparatus and requiring a large amount of heating energy.

The present inventors have found that the above mentioned disadvantages could be completely obviated by a method of heating a complex compound of an alkylaluminum compound to its decomposition temperature.

As a result of extensive studies, the inventors have found that, as the complex compound of an alkylaluminum compound and an alkali metal compound has a smaller chemical reactivity than that of alkylaluminum per se, the former is hardly influenced by active substances, such as oxygen and moisture, possibly present in the atmosphere of the reactor in minute amounts, and consequently suffers from a smaller degree of denaturization than in the latter case. Also, reaction of the complex compound of the alkylaluminum compound is moderate, as compared with that of the alkylaluminum compound per se, so that temperature control in the thermal decomposition process is extremely easy, and side reactions due to local over-heating can be avoided. Furthermore, the reaction mass is generally smaller, compared with the case of using an organic solvent as the reaction medium, whereby the scale of the reaction apparatus is comparatively smaller.

Thus, an object of the invention is to provide a method for manufacturing aluminum of higher purity and by a simpler operation than the conventional methods. Another object is to provide a method capable of being carried out under readily controllable and moderate conditions. Still another object is to provide a method for manufacturing aluminum readily applicable to a continuous process. Other objects and advantages will be apparent from the following description.

To accomplish these objects, the present invention provides a method for manufacturing aluminum which comprises heating a complex compound formed by the interaction of an alkylaluminum compound and an alkali metal compound to a temperature between 180° C. and 300° C. in a heating zone, the alkylaluminum compound having the formula of $(R^1R^2CH-CH_2)_2AlY$ wherein each of $R^1$ and $R^2$ is selected from the group consisting of hydrogen atom and alkyl radicals, and Y is selected from the group consisting of hydrogen atom and $R^1R^2CH-CH_2$-radicals, and the alkali metal compound having the formula of MZ wherein M stands for an alkali metal and Z is selected from the group consisting of alkyl radicals, hydrogen atom, halogen atom and ⅓ $AlF_6$ radical.

As to the alkylaluminum compound moiety of the said complex compound having the general formula of $$(R^1R^2CH-CH_2)_2AlY$$

wherein $R^1$, $R^2$ and Y have the same meanings as indicated above, such compounds as triethylaluminum, diethylaluminum hydride, tri-n-propylaluminum, di-n-propylaluminum hydride, tri-n-butylaluminum, di-n-butylaluminum hydride, triisobutylaluminum, diisobutylaluminum hydride, tri(2-methyl-butyl)aluminum, di(2-methyl-butyl)aluminum hydride, tri(2-methyl-pentyl)aluminum, di(2-methyl-pentyl)aluminum hydride and the like, may practically be employed. Of course, a mixture of more than 2 of them may be employed. Among these compounds, triisobutylaluminum, diisobutylaluminum hydride, and a mixture thereof, are the most favorable.

As to the alkali metal compound moiety having the general formula of MZ, wherein M stands for alkali metal, and Z is selected from the group consisting of alkyl radicals, hydrogen atom, halogen atom, and ⅓ $AlF_6$ radical, such compounds as ethylsodium, sodium fluoride, sodium hydride, potassium fluoride, lithium hydride, cryolite and the like, may practically be employed.

A single alkali metal compound may be employed or if necessary, a mixture may also be utilized.

The alkylaluminum compound and the alkali metal compound form preferably a complex compound having the mole ratio of 1:1 or 1:½ parts derived from the alkylaluminum compound and the alkali metal compound, respectively, for example, $NaF \cdot 2[(iso-C_4H_9)_3Al]$ or $NaF \cdot [(iso-C_4H_9)_3Al]$.

However, the complex compound employed in the present invention may have any mole ratio of the two moieties, and mixtures of the complex compounds having different mole ratios than described above may also be employed.

Further, a complex compound having two or more different alkylaluminum compounds in the molecule, for example $$NaH \cdot Al(C_4H_9)_2H \cdot Al(C_2H_5)_3$$

or $$NaF \cdot Al(C_3H_5)_3 \cdot Al(CH_3)_3$$

may be employed.

Some of these complex compounds have been reported by K. Ziegler et al. (see, for example, German Patent No. 931,107 and No. 925,348), and may be prepared according to their methods. For example, $$NaF \cdot 2[(iso-C_4H_9)_3Al]$$

is obtained as a clear, uniform liquid by mixing 198 g. (1 mol) of triisobutylaluminum with 21 g. (½ mol) of dried sodium fluoride powder in a nitrogen atmosphere, and by heating the mixture with stirring at a temperature of between 130° and 140° C. This complex compound solidifies at 35° C., and melts again upon heating.

In the present invention, the aforesaid complex compound is heated to a temperature at which said complex compound is decomposed to isolate the aluminum. The temperature varies somewhat depending upon the kind of complex compound employed and upon the reaction conditions. In general, the decomposition reaction of the invention starts at about 180° C., but the temperature may preferably be selected within the range of from about 200° C. to 250° C. Temperatures of above 300° C. are to be avoided, since unfavorable byproducts may be formed at such temperatures.

During the course of the present reaction, the decomposition of the complex seems to be somewhat complex. At any rate, the advantages of the present invention manifest themselves upon using the aforementioned complex as a starting material.

Although the method of the invention may be conducted by substantially completely decomposing the complex compound in a heating zone and recovering aluminum from the decomposition products, the method of the invention may advantageously be effected by decomposing the complex compound in a heating zone, and, after beginning to isolate the aluminum, introducing, preferably continuously, an amount of fresh alkylaluminum compound which corresponds to the amount of the alkylaluminum compound moiety in said complex compound that has been consumed to the said heating zone to maintain the liquid composition substantially constant, while continuously separating the aluminum produced by the decomposition from the reaction system.

In one way of performing the method of the invention, the complex compound is at least partially decomposed in the heating zone, and the thus produced aluminum is taken out from the heating zone continuously together with the flow of reaction mass from which the aluminum is separated therefrom, for example, by filtration. After separating the aluminum, the reaction mass (containing the alkali metal compound) is recycled to the heating zone, while fresh alkylaluminum compound which corresponds to the amount of the consumed alkylaluminum compound moiety is continuously supplied to the heating zone, to form more complex compound in the heating zone from the alkali metal compound contained in the said reaction mass and the added alkylaluminum compound. Alternatively fresh alkylaluminum compound may be added to the reaction mass which has been withdrawn from the heating zone and from which aluminum has already been separated, to form more complex compound (with the alkali metal compound remaining in the reaction mass) in a complex compound forming zone, and then the thus obtained complex compound may be continuously supplied to the heating zone. As a further alternative, a method may also advantageously be employed in which the complex compound is heated to a temperature at which said compound is decomposed, in a heating zone, and the thus produced aluminum which is deposited at the bottom of the heating zone as the reaction proceeds is continuously or intermittently taken out, or scraped up, leaving the reaction mass in the heating zone, while an amount of fresh alkylaluminum compound corresponding to the amount of the consumed alkylaluminum compound moiety is continuously supplied to the heating zone. In this case, the form and the composition of the reaction mass to be recycled may vary in accordance with the kind of raw material and with the decomposition temperature employed. Consequently, the reaction mass remaining within the reactor has not always the same form of complex compound as that at the starting stage, but there will be no trouble in practicing the present invention by using such a reaction mass. The alkylaluminum compound in the reactor may, in some cases, be present partly in the free form and may be subjected to the thermal decomposition in this free form. However, it is not desirable that such free alkylaluminum compound is present in an amount of about 20% or more in the reaction mass, because this results in deterioration of the quality of the aluminum produced. The alkali metal compound to be reacted with the alkylaluminum compound has no influence upon the reaction even if it is present in an excess amount in the heating zone.

Upon heating the complex compound of the alkylaluminum compound up to the decomposition temperature, aluminum is readily isolated in the reaction system and, at the same time, olefin and hydrogen gas are generated. Thus produced aluminum is obtained as a thin film adhered on the wall of reactor at the early stages of reaction but, as the isolation of aluminum proceeds, the aluminum is grown in a particle size and is easily stripped off from the said wall. If in this case a small amount of aluminum powder, particles, or small pieces are added in the reactor as seeds for growing aluminum, the isolation of aluminum on the wall can be completely avoided, and aluminum having large and uniform particle size can be obtained.

In some cases, it is advantageous to preliminarily seed finely divided aluminum powders in the reaction mass to be decomposed. This serves for formation of aluminum of comparatively large and uniform particle size without adhering onto the wall of the reactor. The seed aluminum powder may be added directly to the reactor, or may be preliminarily mixed with the alkylaluminum compound and/or the recycled reaction mass, preferably in a mixing vessel, the latter being advantageously equipped with a stirrer.

During the decomposition reaction, olefin and hydrogen gas are generated. The olefin has correspondingly the formula of $R^1R^2C=CH_2$, wherein $R^1$ and $R^2$ have the same meanings as in the formula for the alkylaluminum compound. The amounts of the generated olefin and hydrogen gas are almost quantitative, so that the progress of the decomposition reaction can be traced through measurement of the gas volume. The gases are advantageously reused as the materials for preparation of alkylaluminum compounds.

If desired, during the decomposition reaction of the invention an inert gas, such as hydrogen or argon, may be introduced to drive the generated olefin gas out of the reaction mixture, thereby to accelerate the decomposition reaction. Furthermore exhaustion of the generated gas mixture can be helped by carrying out the reaction under a weak subatmospheric pressure.

In order to control the temperature and the viscosity of the reaction mass, a medium, such as hydrocarbon, ethers, and amines, may successfully be employed to mix with the complex compound in the present invention, if desired. The medium should have a higher boiling point than the decomposition temperature of the complex compound. In mixing the medium with the complex compound, any mixing ratio may be utilized, but the amount of the medium is preferably equal to or less than that of the compound. Thereafter the dispersion formed is subjected to the thermal decomposition reaction.

The aluminum produced by the thermal decomposition method of the present invention is taken out from the reactor, washed with a saturated hydrocarbon having a lower boiling point, such as hexane and heptane, and dried.

Thus, the aluminum having high purity as shown in the following Table 2 could be obtained.

TABLE 2

| Component: | Composition (percent) |
|---|---|
| Fe | 0.001 |
| Si | 0.002 |
| Al | more than 99.99 |

The appended drawings are for the purpose of indicating a favorable mode of practice of the present invention, whereby the invention will be more fully understood. As shown in the figure, an alkyl aluminum compound is introduced through the inlet pipe 1 into the distributor 10 having a number of nozzles at the bottom part, through which an amount of alkylaluminum compound corresponding to the amount consumed in the thermal decomposition is added to the reactor 4 drop by drop. In the reactor 4, the alkylaluminum compound is combined with the alkali metal compound which is recycled through the inlet pipe 2 and which is somewhat changed in its form and its composition by the thermal decomposition, to give regenerated complex compound and then the complex is subjected to decomposition to isolate aluminum. In general, the regeneration of the complex compound is carried out so rapidly at the temperature at which the complex is decomposed that it is needless to provide a mixer outside the reactor to promote the regeneration of the complex compound. If a mixer is set up, a small one may suffice. The amount of alkylaluminum compound to be added may easily be controlled by means of the valve connected to the inlet pipe 1. The isolated aluminum, which is formed by thermal decomposition of the complex compound in the reactor 4 heated by the heater 3, is sent, along with the flow of the reaction mass, to one of the two filters 5 installed in parallel, where the aluminum is separated by filtration from the reaction mass.

The filtrate is sent again to the reactor 4 through the inlet pipe 2 by means of the pump 6. The gas mixture generated during the decomposition is exhausted through an outlet pipe 9. When a sufficient amount of aluminum is separated in one filter, the flow of material is switched to the other filter. To the first-mentioned filter containing aluminum, an inert gas is sent through the inlet pipe 7 to cause any reaction mass remaining in the filter to flow out through the outlet pipe 8, and thereafter, a lower boiling saturated hydrocarbon solvent, such as n-hexane, is poured through the inlet pipe 7 to the filter to remove the reaction mass adhered to the aluminum by washing, followed by recovery of the aluminum. In this way, aluminum can be taken out exceedingly easily by alternating use of the two filters, and so the decomposition reaction and the separation of aluminum can be carried out continuously.

The invention will more fully be described in the following examples, which, however, are set forth merely by way of illustration and not by way of limitation.

Example 1.—A four-necked flask having a thermometer, a dropping funnel, a stirrer and an outlet glass tube connected to a gas tank, was filled with nitrogen gas. Into the flask, 43.8 grams of the complex compound of sodium fluoride and triisobutylaluminum (in mol ratio of 1:2), was charged, and 19.8 g. of triisobutylaluminum was charged into the dropping funnel. The flask was heated gradually at the bottom by means of a flask-heater up to 220° C. The complex compound was decomposed with generation of a gas mixture, and aluminum was isolated in the reaction mass in the form of film in the earlier stages of the decomposition and in the form of silver-white granules in the later stages of the decomposition. Observing the amount of generated gas, an amount of triisobutylaluminum corresponding to the amount consumed was added to the flask through the dropping funnel, whereby the reaction mass in the flask was maintained in a definite composition.

After adding the triisobutylaluminum through the dropping funnel, the heating was discontinued. The yield of aluminum and that of gas were 2.8 g. and 10.4 liters (at 0° C. and 1 atm.) respectively, the composition of the gas being 66.5% of isobutylene, 32.5% of hydrogen, and 1.0% of isobutane.

Employing the same apparatus and the same procedure as above-described, the decomposition reactions were carried out by use of complex compounds of triethylaluminum, triisobutylaluminum or diisobutylaluminum hydride with sodium fluoride, potassium fluoride, sodium hydride, ethyl sodium and lithium hydride. The results obtained are tabulated below.

| Alkylaluminum compound | Alkali metal compound | Weight of the complex compound (g.) | Weight of alkyl-aluminum compound dropped (g.) | Decomposition temperature (° C.) | Yield of isolated aluminum (g.) | Volume of generated gas (liter, at 0° C. 1 atm.) |
|---|---|---|---|---|---|---|
| Triethyl aluminum | Sodium fluoride | 27.0 | 22.8 | 255 | 5.4 | 15.2 |
| Triisobutyl aluminum | Potassium fluoride | 45.4 | 19.8 | 236 | 2.7 | 10.2 |
| Diisobutyl aluminum hydride | do | 34.2 | 14.2 | 230 | 2.7 | 7.9 |
| Triisobutyl aluminum | Sodium hydride | 42.0 | 19.8 | 225 | 2.6 | 10.2 |
| Diisobutylaluminum hydride | do | 30.8 | 28.4 | 226 | 5.4 | 15.6 |
| Triisobutyl aluminum | Ethyl sodium | 25.0 | 19.8 | 227 | 2.7 | 10.1 |
| Do | Lithium hydride | 40.4 | 19.8 | 226 | 2.7 | 10.2 |

*Example 2.*—A complex compound of sodium fluoride and triisobutylaluminum (in mol ratio of 1:2) was subjected to a continuous decomposition process, using the apparatus shown in FIG. 1. The reaction mass was recyclically introduced to the reactor through the inlet pipe 2 at the rate of 95.5 g./min., and triisobutylaluminum was dropped into the reactor 4 heated to 250° C. through the distributor 10 via the inlet pipe 1 at the rate of 4.5 g./min. The silver white aluminum granules produced by the decomposition of the complex compound were sent to the filter 5 along with the flow of the reaction mass, where the aluminum was separated from the reaction mass. The filtrate was returned back to the reactor by means of the pump 6. The amount of gas generated in the course of the decomposition was measured with a gas meter connected to the outlet pipe 9.

The aluminum isolation velocity was 0.61 g./min., the gas generation velocity was 2.3 liters/min., and the composition of gas was 66.8% of isobutylene, 32.3% of hydrogen, and 0.9% of isobutane.

What we claim is:

1. A method for manufactuing aluminum, which comprises heating a complex compound of an alkylaluminum compound and an alkali metal compound to a temperature between 180° C. and 300° C., the alkylaluminum compound having the formula of $(R^1R^2CH\text{---}CH_2)_2AlY$ wherein each of $R^1$ and $R^2$ is selected from the group consisting of hydrogen atom and alkyl radicals, and Y is selected from the group consisting of hydrogen atom and $R^1R^2CH\text{---}CH_2$-radicals, and the alkali metal compound having the formula of MZ wherein M stands for an alkali metal and Z is selected from the group consisting of alkyl radicals, hydrogen atom, halogen atom and ⅓ $AlF_6$ radical.

2. A method according to the claim 1, wherein the said alkylaluminum compond is selected from the group consisting of triethylaluminum, triisobutylaluminum and diisobutylaluminum hydride.

3. A method according to the claim 1, wherein the said decomposition reaction is carried out in the presence of seed aluminum powder.

4. A method according to the claim 1, wherein the said alkali metal compound is selected from the group consisting of ethylsodium, sodium fluoride, sodium hydride, potassium fluoride, lithium hydride and cryolite.

5. A method for continuously manufacturing aluminum which comprises heating a complex compound of an alkylaluminum compound and an alkali metal compound to a temperature between 180° C. and 300° C. in a heating zone, the alkylaluminum compound having the formula of $(R^1R^2CH\text{---}CH_2)_2AlY$ wherein each of $R^1$ and $R^2$ is selected from the group consisting of hydrogen atom and alkyl radicals, and Y is selected from the group consisting of hydrogen atom and $R^1R^2CH\text{---}CH_2$-radicals, and the alkali metal compound having the formula of MZ wherein M stands for an alkali metal and Z is selected from the group consisting of alkyl radicals, hydrogen atom, halogen atom and ⅓ $AlF_6$ radical, and continuously introducing an amount of a fresh alkylaluminum compound corresponding to the amount of alkylaluminum compound moiety in said complex compound consumed in said heating step to the said heating zone, while continuously separating the aluminum produced by the decomposition from the reaction system.

6. A method according to the claim 5, wherein the said alkylaluminum compound is selected from the group consisting of triethylaluminum, triisobutylaluminum and diisobutylaluminum hydride.

7. A method according to the claim 5, wherein the said decomposition reaction is carried out in the presence of seed aluminum powder.

8. A method according to the claim 5, wherein the said alkali metal compound is selected from the group consisting of ethylsodium, sodium fluoride, sodium hydride, potassium fluoride, lithium hydride and cryolite.

9. A method according to the claim 5, wherein the said separation of aluminum is carried out by drawing out the aluminum produced at the bottom of the reaction zone, upwardly, leaving the reaction mass in the heating zone.

10. A method for continuously manufacturing aluminum which comprises heating a complex compound of an alkylaluminum compound and an alkali metal compound in a heating zone to a temperature between 180° C. and 300° C., the alkylaluminum compound having the formula of $(R^1R^2CH\text{---}CH_2)_2AlY$ wherein each of $R^1$ and $R^2$ is selected from the group consisting of hydrogen atom and alkyl radicals, and Y is selected from the group consisting of hydrogen atom and $R^1R^2CH\text{---}CH_2$-radicals, and the alkali metal compound having the formula of MZ wherein M stands for an alkali metal and Z is selected from the group consisting of alkyl radicals, hydrogen atom, halogen atom and ⅓ $AlF_6$ radical, continuously supplying an amount of a fresh alkylaluminum compound corresponding to the amount of the consumed alkylaluminum compound moiety to the heating zone while taking out the aluminum produced by the decomposition from the heating zone together with reaction mass, separating the said aluminum from the said reaction mass, and recycling the remaining reaction mass into the heating zone to make the complex compound in the heating zone from the alkali metal compound included in the said reaction mass and the said supplied alkylaluminum compound.

11. A method according to the claim 10, wherein the said alkylaluminum compound is selected from the group consisting of triethylaluminum, triisobutylaluminum and diisobutylaluminum hydride.

12. A method according to the claim 10, wherein the said decomposition reaction is carried out in the presence of seed aluminum powder.

13. A method according to the claim 10, wherein said alkali metal compound is selected from the group consisting of ethylsodium, sodium fluoride, sodium hydride, potassium fluoride, lithium hydride and cryolite.

14. A method for continuously manufacturing aluminum which comprises heating a complex compound of an alkylaluminum compound and an alkali metal compound in a heating zone to a temperature between 180° C. and 300° C., the alkylaluminum compound having the formula of $(R^1R^2CH-CH_2)_2AlY$ wherein each of $R^1$ and $R^2$ is selected from the group consisting of hydrogen atom and alkyl radicals, and Y is selected from the group consisting of hydrogen atom and $R^1R^2CH-CH_2$- radicals, and the alkali metal compound having the formula of MZ wherein M stands for an alkali metal and Z is selected from the group consisting of alkyl radicals, hydrogen atom, halogen atom and ⅓ $AlF_6$ radical, supplying an amount of a fresh alkylaluminum compound corresponding to the amount of the consumed alkylaluminum compound moiety into a complex compound forming zone, recycling reaction mass containing the alkali metal compound into the complex compound forming zone to make the complex compound, continuously supplying thus obtained complex compound to the heating zone, while taking out the aluminum produced by the decomposition from the heating zone together with the reaction mass, separating the aluminum from the said reaction mass and repeating the recycle.

15. A method according to the claim 14, wherein the said alkylaluminum compound is selected from the group consisting of triethylaluminum, triisobutylaluminum and diisobutylaluminum hydride.

16. A method according to the claim 14, wherein the said decomposition reaction is carried out in the presence of seed aluminum powder.

17. A method according to the claim 14, wherein the said alkali metal compound is selected from the group consisting of ethylsodium, sodium fluoride, sodium hydride, potassium fluoride, lithium hydride and cryolite.

References Cited by the Examiner

UNITED STATES PATENTS

| | | | |
|---|---|---|---|
| 1,836,732 | 12/1931 | Schlecht | 75—0.56 |
| 2,816,826 | 12/1957 | Brennan | 75—0.56 |
| 2,843,474 | 7/1958 | Ziegler | 75—68 |
| 2,900,245 | 8/1959 | Beller | 75—0.56 |

FOREIGN PATENTS 600,349    6/1960    Canada.

DAVID L. RECK, *Primary Examiner.*

BENJAMIN HENKIN, *Examiner.*

H. W. CUMMINGS, H. W. TARRING,
*Assistant Examiners.*